(12) United States Patent  
Adrangi et al.

(10) Patent No.: US 9,305,194 B2  
(45) Date of Patent: Apr. 5, 2016

(54) ONE-TOUCH INPUT INTERFACE

(71) Applicant: Intel Corporation, Santa Clara, CA (US)

(72) Inventors: Farid Adrangi, Lake Oswego, OR (US); Anand S. Konanur, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/227,846

(22) Filed: Mar. 27, 2014

(65) Prior Publication Data

US 2015/0278562 A1    Oct. 1, 2015

(51) Int. Cl.
| | |
|---|---|
| H04B 7/00 | (2006.01) |
| G06K 7/10 | (2006.01) |
| G06F 3/041 | (2006.01) |
| G06K 19/07 | (2006.01) |
| G06K 19/073 | (2006.01) |
| H04B 1/68 | (2006.01) |

(52) U.S. Cl.
CPC ............ *G06K 7/10237* (2013.01); *G06F 3/041* (2013.01); *G06K 19/0718* (2013.01); *G06K 19/07354* (2013.01)

(58) Field of Classification Search
CPC .......................... H04W 12/06; H04L 63/0861
USPC ................. 455/41.2–41.3, 410–411
See application file for complete search history.

(56) References Cited

U.S. PATENT DOCUMENTS

| | | |
|---|---|---|
| 4,793,353 A | 12/1988 | Borkan |
| 6,130,602 A | 10/2000 | O'Toole et al. |
| 6,173,899 B1 | 1/2001 | Rozin |
| 7,190,165 B2 | 3/2007 | Hammond et al. |
| 8,537,907 B2 | 9/2013 | Sung |
| 8,706,172 B2 | 4/2014 | Priyantha et al. |
| 2006/0095369 A1 | 5/2006 | Hofi |
| 2007/0247431 A1 | 10/2007 | Skillman et al. |
| 2008/0054638 A1 | 3/2008 | Greene et al. |
| 2008/0219464 A1 | 9/2008 | Smith |
| 2008/0272889 A1 | 11/2008 | Symons |
| 2009/0213081 A1 | 8/2009 | Case, Jr. |
| 2011/0115652 A1 | 5/2011 | Werner et al. |
| 2011/0241837 A1 | 10/2011 | Suzuki |
| 2012/0058724 A1 | 3/2012 | Yamada et al. |

(Continued)

FOREIGN PATENT DOCUMENTS

| | | |
|---|---|---|
| KR | 10-2011-0050313 A | 5/2011 |
| KR | 10-2013-0055729 A | 5/2013 |

OTHER PUBLICATIONS

International Search Report and Written Opinion for PCT Patent Application No. PCT/US2013/062878, mailed on Jun. 27, 2014, 16 pages.

(Continued)

*Primary Examiner* — Lee Nguyen

(74) *Attorney, Agent, or Firm* — Shichrur & Co.

(57) ABSTRACT

Some demonstrative embodiments include a one-touch input interface. For example, a one-touch input interface may include a hybrid Body-Area-Network (BAN) Near-Field-Communication (NFC) module to receive NFC information from a NFC device via a body of a user; and a fingerprint sensor to sense a fingerprint of the user, wherein the hybrid BAN NFC module and the fingerprint sensor are to receive the NFC information and to sense the fingerprint during a touch of the one-touch interface by the user.

23 Claims, 7 Drawing Sheets

(56) References Cited

U.S. PATENT DOCUMENTS

| | | | |
|---|---|---|---|
| 2012/0135693 | A1 | 5/2012 | Teruyama |
| 2012/0137310 | A1 | 5/2012 | Teruyama |
| 2013/0194632 | A1* | 8/2013 | Kishimoto ............ 358/1.15 |
| 2013/0231046 | A1 | 9/2013 | Pope et al. |
| 2014/0145515 | A1 | 5/2014 | Jung et al. |
| 2014/0203660 | A1 | 7/2014 | Adachi |
| 2014/0247246 | A1 | 9/2014 | Maus |
| 2014/0268612 | A1 | 9/2014 | Zhang et al. |
| 2014/0320536 | A1 | 10/2014 | Mok et al. |
| 2015/0056979 | A1 | 2/2015 | Davis et al. |
| 2015/0091859 | A1 | 4/2015 | Rosenberg et al. |
| 2015/0093988 | A1 | 4/2015 | Konanur et al. |
| 2015/0163221 | A1* | 6/2015 | Bolin ............ H04L 63/0861 |
| 2015/0189463 | A1 | 7/2015 | Klabunde et al. |

OTHER PUBLICATIONS

Korishe, Abdulah, "A Driver Circuit for Body-Coupled Communication", Department of Electrical Engineering, Linkoping University, Jun. 3, 2013, 90 pages.

Advanced Card Systems Ltd., "AET62 NFC Reader with Fingerprint Sensor", downloaded from: http://acs.com.hk/en/products/130/aet62-nfc-reader-with-fingerprint-sensor/, downloaded on Feb. 17, 2014, 1 page.

Office Action for U.S. Appl. No. 14/129,948, mailed on Aug. 14, 2015, 15 pages.

IEEE Std 802.15.6™-2012, IEEE Standard for Local and metropolitan area networks—Part 15.6: Wireless Body Area Networks, Feb. 29, 2012, 271 pages.

* cited by examiner

ONE-TOUCH INPUT INTERFACE

TECHNICAL FIELD

Embodiments described herein generally relate to a one-touch input interface.

BACKGROUND

Near Field Communication (NFC) technology may be used in a mobile phone and/or in a computing device for proximity-based applications, e.g., tap to perform interaction with another device. For example, a user may tap the mobile phone on another mobile phone to exchange data.

The NFC technology may also be used for security applications, e.g., tapping a mobile phone to perform a secure operation. For example, the user may tap the mobile phone on a payment terminal, for example, to pay for a product, and/or the user may tap the mobile phone on a laptop to enable the user to login to a secure application.

The NFC technology may be utilized in wearable devices, e.g., bands, glasses, clothing, shoes, tags, and the like, and may enable to safely store and provide user credentials to authenticate the user, for example, for security applications, e.g., tapping a tag on a door sensor to open the door.

Fingerprint Readers are becoming popular on mobile phones and/or on computing devices for authentication of a user, for example, to perform online payment.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
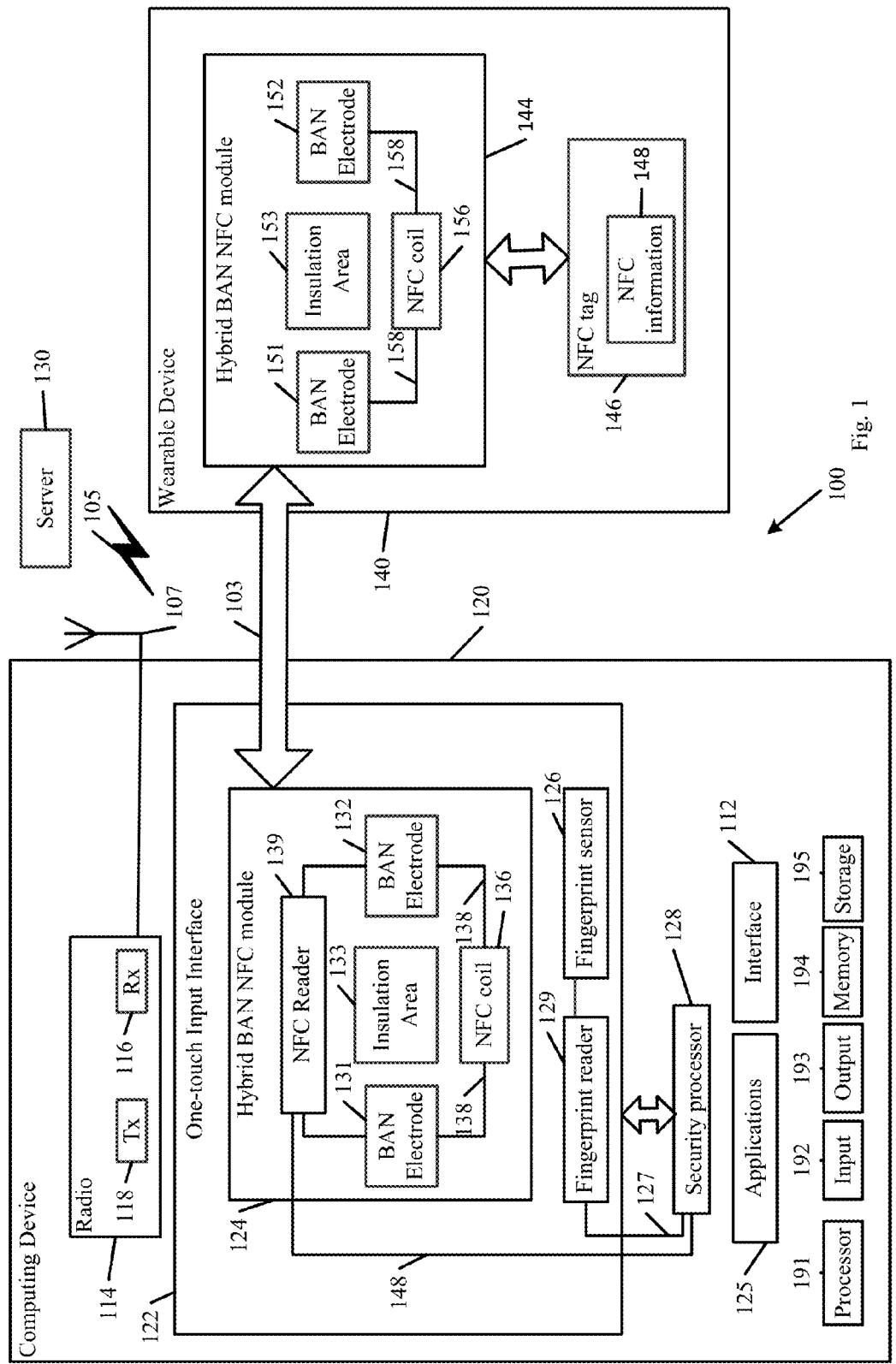
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a video device, an audio device, an audio-video (A/V) device, and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks— Specific requirements Part 11: Wireless LAN Medium Access Control (MAC) and Physical Layer (PHY) Specifications*, Mar. 29, 2012; *IEEE802.11 task group ac (TGac)* ("*IEEE802.11-09/0308r12 —TGac Channel Model Addendum Document*"); *IEEE 802.11 task group ad (TGad)* (*IEEE P802.11ad-2012, IEEE Standard for Information Technology—Telecommunications and Information Exchange Between Systems—Local and Metropolitan Area Networks— Specific Requirements—Part 11: Wireless LAN Medium*

Access Control (MAC) and Physical Layer (PHY) Specifications—Amendment 3: Enhancements for Very High Throughput in the 60 GHz Band, 28 Dec., 2012)) and/or future versions and/or derivatives thereof, devices and/or networks operating in accordance with existing WirelessHD™ specifications, and/or future versions and/or derivatives thereof, devices and/or networks operating in accordance with existing and/or Wireless Fidelity (WiFi) Alliance (WFA) Peer-to-Peer (P2P) specifications (*WiFi P2P technical specification version* 1.2, 2012) and/or future versions and/or derivatives thereof, units and/or devices which are part of the above networks, and the like.

Some embodiments may be used in conjunction with a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include one or more devices capable of communicating content, data, information and/or signals.

In some demonstrative embodiments, system 100 may include a computing device 120, and a wearable device 140.

In some demonstrative embodiments, computing device 120 may include a mobile or a non-mobile device.

In some demonstrative embodiments, computing device 120 may include, for example, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a digital audio player, a gaming device, a data source, a data sink, a Digital Still camera (DSC), a media player, a Smartphone, a television, a music player, or the like.

In some demonstrative embodiments, computing device 120 may also include, for example, a processor 191, an input unit 192, an output unit 193, a memory unit 194, and/or a storage unit 195. Computing device 120 may optionally include other suitable hardware components and/or software components. In some demonstrative embodiments, some or all of the components of computing device 120 may be enclosed in a common housing or packaging, and may be interconnected or operably associated using one or more wired or wireless links. In other embodiments, components of computing device 120 may be distributed among multiple or separate devices.

Processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of computing device 120 and/or of one or more suitable applications.

Memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by computing device 120.

Input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, Cathode Ray Tube (CRT) display unit, one or more audio speakers or earphones, or other suitable output devices.

In some demonstrative embodiments, computing device 120 may include a wireless communication device capable of communicating content, data, information and/or signals via a wireless medium (WM) 105 with one or more other wireless communication devices. For example, computing device 120 may communicate with a server 130 via WM 105.

In some demonstrative embodiments, WM 105 may include, for example, a radio channel, a cellular channel, an RF channel, a Wireless Fidelity (WiFi) channel, an IR channel, and the like.

In other embodiments, computing device 120 may optionally be capable of communicating over any suitable wired communication links. For example, computing device 120 may communicate with server 130 via a wired link.

In some demonstrative embodiments, computing device 120 may include one or more radios 114 to perform wireless communication between computing device 120 and one or more other wireless communication devices. For example, radios 114 may perform wireless communication between computing device 120 and server 130.

In some demonstrative embodiments, radios 114 may include one or more wireless receivers (Rx) 116, able to receive wireless communication signals, RF signals, frames, blocks, transmission streams, packets, messages, data items, and/or data.

In some demonstrative embodiments, radios 114 may include one or more wireless transmitters (Tx) 118, able to send wireless communication signals, RF signals, frames, blocks, transmission streams, packets, messages, data items, and/or data.

In some demonstrative embodiments, radios 114 may include modulation elements, demodulation elements, amplifiers, analog to digital and digital to analog converters, filters, and/or the like. For example, radios 114 may include or may be implemented as part of a wireless Network Interface Card (NIC), and the like.

In some demonstrative embodiments, radios 114 may include, or may be associated with, one or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive antenna functionalities using separate transmit and receive antenna elements. In some embodiments, antennas 107 may implement transmit and receive functionalities using common and/or integrated transmit/receive elements.

In some demonstrative embodiments, wearable device 140 may include any device at least partially having contact with a human body. For example, wearable device 140 may include a wrist watch, jewelry, e.g., a necklace and/or a ring, a footwear, an eye glasses, a clothing item, e.g., a shirt, and or any other accessory configured to be in a close proximity to the human body.

In some demonstrative embodiments, a user of device 140 may wear wearable device 140.

In one example, wearable device 140 may include a wristwatch to be worn on an arm of the user.

In another example, wearable device 140 may include a ring to be worn on a finger of the user.

In some demonstrative embodiments, wearable device 140 may include a Near Field Communication (NFC) device. For example, device 140 may include NFC embedded and/or tagged devices, an NFC smartcard, an NFC key, an NFC tag and the like.

In some demonstrative embodiments, a first NFC device may be capable of establishing communication with a second NFC device, for example, by tapping the first NFC device on the second NFC device, and/or by bringing the first NFC device and the second NFC device within close proximity, e.g., a proximity of between a few millimeters and a few centimeters.

In some demonstrative embodiments, computing device 120 may enable the user of wearable device 140 to perform one or more operations and/or functionalities.

In some demonstrative embodiments, computing device 120 may include one or more applications/functionalities 125 to enable the user of device 140 to perform the one or more operations and/or functionalities.

In one example, applications 125 may enable the user to perform one or more transactions, for example, if applications 125 include an online shopping application, an online payment application, and/or the like.

In another example, applications 125 may enable access of the user to one or more services, e.g., managing a bank account of the user and the like, for example, if applications 125 include secure login applications.

In some demonstrative embodiments, applications 125 may be required to authenticate the user of device 140, for example, before enabling the user to perform the one or more operations.

In one example, applications 125 may authenticate the user of device 140, for example, to enable the user to perform the transactions and/or to access the services.

In some demonstrative embodiments, computing device 120 may be configured to authenticate the user of device 140, for example, to enable the user to perform the one or more operations on applications 125.

In one example, computing device 120 may authenticate the user, for example, if the user performs one or more transactions of monetary value, for example, utilizing applications 125.

In another example, computing device 120 may authenticate the user, for example, if the user requests access to one or more services, which require a secure login.

In some demonstrative embodiments, computing device 120 may be configured to receive authentication information from the user of wearable device 140, for example, to authenticate the user.

In some demonstrative embodiments, computing device 120 may be configured to authenticate the user using a two-factor authentication.

In some demonstrative embodiments, the two factor authentication may include a first authentication factor and a second, e.g., different, authentication factor. For example, computing device 120 may not authenticate the user, for example, if the user is not authenticated by both the first factor and by the second factor.

In some demonstrative embodiments, the first factor may include an inherent factor, e.g., a factor to identify the user, e.g., a "who you are" factor, for example, biometric information, e.g., a fingerprint.

In some demonstrative embodiments, the second factor may include a possession factor, e.g., a factor to identify an element, which belongs to and/or is possessed by the user, e.g., a "what you have" factor, for example, a tag, a smart card, a key, a code, and/or the like.

In some demonstrative embodiments, computing device 120 may be configured to receive authentication information of the two-factor authentication and to authenticate the user based on the first and second factors.

In some demonstrative embodiments, the first factor of the authentication information may include a fingerprint of the user, e.g., as described below.

In some demonstrative embodiments, the second factor may include authentication information stored on device 140, e.g., as described below.

In some demonstrative embodiments, device 140 may include an NFC tag 146 including NFC information 148.

In one example, NFC tag 146 may include an NFC tag and/or an NFC tag emulation.

In some demonstrative embodiments, NFC information 148 may include authentication information to authenticate the user.

In one example, NFC information 148 may include a unique key and/or a code to identify the user.

In another example, NFC information 148 may include encrypted personal details of the user.

In some demonstrative embodiments, NFC information 148 may include payment information, for example, to facilitate a transaction of monetary value. For example, NFC information 148 may include a credit card number, personal details of the user and the like.

In some demonstrative embodiments, computing device 120 may utilize finger print information of the fingerprint of the user, for example, as the first factor to authenticate the user of device 140.

In some demonstrative embodiments, computing device 120 may utilize NFC information 148, for example, as the second factor to authenticate the user of device 140.

In some demonstrative embodiments, computing device 120 may be configured to authenticate the user using the two-factor authentication, while providing an enhanced user experience. For example, the user may be required to perform a single operation to enable computing device 120 to authenticate the user using the two-factor authentication, e.g., as described below.

In some demonstrative embodiments, computing device 120 may enable authenticating the user using the two-factor authentication, for example, by a single touch of the user on computing device 120, e.g., as described below.

In some demonstrative embodiments, the single touch may include, a one touch of the user, a one touch of the hand of the user, a one tap of the hand of the user, and the like.

For example, computing device 120 may be configured to receive the first factor, e.g., the fingerprint of the user, and the second factor, e.g., NFC information 148, during a single hand touch of the user on computing device 120.

In some demonstrative embodiments, computing device 120 may include a one-touch input interface 122 configured to receive input from the user of NFC device 140 via a single hand touch by the user.

In some demonstrative embodiments, one-touch input interface 122 may be configured to enable authentication of the user of NFC device 140 via the single hand touch.

In some demonstrative embodiments, computing device 120 may include a user interface 112 to prompt the user to touch one-touch input interface 122.

In one example, user interface 112 may include a graphical user interface (GUI) of applications 125.

In another example, user interface 112 may include an on screen display (OSD) to be displayed on a display of computing device 120.

In some demonstrative embodiments, the user of device 140 may touch one-touch input interface 122, for example, when prompted by user interface 112.

In some demonstrative embodiments, computing device 120 may receive the input information from the user, for example, when the user touches or taps one-touch input interface 122.

In some demonstrative embodiments, one-touch input interface 122 may include a fingerprint sensor 126 to sense a fingerprint of the user and to provide fingerprint information 127 of the fingerprint, for example, if the user touches one-touch input interface 122.

In some demonstrative embodiments, one-touch input interface 122 may include a hybrid Body-Area-Network (BAN) NFC module 124 to receive NFC information 148, for example, when the user touches or taps one-touch input interface 122.

In some demonstrative embodiments, BAN NFC module 124 may be configured to receive NFC information 148 from wearable device 140 via a body of the user, for example, when the user touches or taps one-touch input interface 122, e.g., as described below.

In some demonstrative embodiments, fingerprint sensor 126 and hybrid BAN NFC module 124 may be arranged to receive NFC information 148 and to sense the fingerprint of the user during the tap or touch of the user.

In some demonstrative embodiments, fingerprint sensor 126 may sense the fingerprint of the user and BAN NFC module 124 may receive NFC information 148 from wearable device 140 simultaneously or substantially simultaneously. For example, fingerprint sensor 126 may sense the fingerprint of the user, while BAN NFC module 124 may receive NFC information 148 via the body of the user.

In some demonstrative embodiments, one-touch input interface 122 may include a fingerprint reader 129 configured to read and/or process fingerprint information 127 and to provide to a security processor 128 the first factor for authentication of the user, e.g., a key, a code and/or any other information representing fingerprint information 127.

In some demonstrative embodiments, one-touch input interface 122 may include an NFC reader 139 configured to read and/or process NFC information 148 and to provide to security processor 128 the second factor for authentication of the user, e.g., a key, a code and/or the like.

In some demonstrative embodiments, computing device 120 may include security processor 128 to process NFC information 148 and fingerprint information 127 of the fingerprint.

In some demonstrative embodiments, security processor 128 may utilize NFC information 148 and fingerprint information 127, for example, to authenticate the user using the two-factor authentication.

In some demonstrative embodiments, security processor 128 may utilize fingerprint information 127 as the first factor to authenticate the user, and NFC information 148 as the second factor 148.

In some demonstrative embodiments, security processor 128 may authenticate the user, for example, based on the first and second factors.

In some demonstrative embodiments, security processor 128 may provide the first and the second factors to applications 125, e.g., in a secure and/or encrypted manner, for example, to enable applications 125 to authenticate the user.

In some demonstrative embodiments, applications 125 may authenticate the user, for example, via remote authentication server, e.g., server 130.

In one example, server 130 may include a server of a Service Provider (SP), configured to provide authentication services, for example, to online merchants, to shopping stores and the like.

In some demonstrative embodiments, the user may register at the SP, for example, prior to utilizing one-touch input interface 122.

In some demonstrative embodiments, the SP may provision wearable device 140 with payment credentials, for example, the SP may store a code and/or key on NFC tag 146, e.g., NFC information 148.

In some demonstrative embodiments, the user may be required to scan the fingerprint of the user by fingerprint sensor 126, for example, to register and/or to store a biometric credential, e.g., the fingerprint, of the user at the SP and/or at computing device 120, e.g., for future comparison with a fingerprint scanned by fingerprint sensor 126.

In some demonstrative embodiments, security processor 128 may include an applet, e.g., embedded in a Platform Controller Hub (PCH) of security processor 128, which may be configured to provision the SP.

In some demonstrative embodiments, security processor 128 may generate a HW assisted session key to encrypt communication between the SP and security processor 128.

In some demonstrative embodiments, security processor 128 may send to the SP fingerprint information 127 and/or NFC information 148 encrypted utilizing the HW assisted session key.

In some demonstrative embodiments, the user and/or the merchant may be notified that the payment is confirmed, for example, if the payment credential information is verified, e.g., by an SP payment server.

In some demonstrative embodiments, applications 125 may enable the user to perform one or more operations on applications 125, which require two-factor authentication of the user, for example, if server 130 authenticates the user.

In one example, computing device 120 may include a payment terminal and applications 125 may include a payment application. According to this example, the user may shop for one or more products, and when the user completes to shop for the product the user may tap her hand on the payment terminal to complete the payment. The payment terminal may process the authentication information, e.g., using a credit card issuer server, and may charge, for example, a credit card of the user for the payment.

In some demonstrative embodiments, hybrid BAN NFC module 124 may enable receiving of NFC information 148 from device 140 via the body of the user, e.g., as described below.

In some demonstrative embodiments, hybrid BAN NFC module 124 may enable supplying power to device 140, for example, if device 140 includes a battery-less or a power less device, e.g., if device 140 does not have an internal power supply.

In some demonstrative embodiments, NFC device 140 may include a hybrid BAN NFC module 144 configured to communicate with hybrid BAN NFC module 124 via the body of the user, e.g., as described below.

In some demonstrative embodiments, hybrid BAN NFC modules 126 and/or 146 may be configured to utilize the body of the user as a secure channel for communication between device 120 and device 140.

In some demonstrative embodiments, capacitively-coupled signals, e.g., signals coupled through a capacitance to the body of the user, may travel on the surface of the skin of the user and may be configured to communicate data, e.g., NFC information 148, between device 120 and device 140.

In some demonstrative embodiments, hybrid BAN NFC module 124 and hybrid BAN NFC module 144 may be configured to establish a BAN NFC communication channel 103 via the body of the user.

In some demonstrative embodiments, hybrid BAN NFC module 124 may be configured to receive NFC information 148 from hybrid BAN NFC module 144 via BAN NFC communication channel 103, e.g., as described below.

In some demonstrative embodiments, hybrid BAN NFC module 124 may be positioned to be in contact with an area of a hand of the user, when fingerprint sensor 126 is to be in contact with a finger of the hand.

In some demonstrative embodiments, hybrid BAN NFC module 144 may be configured to be in contact with the body of the user.

In one example, hybrid BAN NFC module 144 may be configured to be in contact with an arm of the user, for example, if NFC device 140 includes a wristwatch.

In another example, hybrid BAN NFC module 144 may be configured to be in contact with a finger of the user, for example, if NFC device 140 includes a ring.

In some demonstrative embodiments, hybrid BAN NFC module 124 may include a first BAN electrode 131 to be in contact with a first area of the hand of the user, and a second BAN electrode 132 to be in contact with a second area of the hand of the user.

In other embodiments, hybrid BAN NFC module 124 may include a single BAN electrode, or more than two BAN electrodes, e.g., three BAN electrodes.

In some demonstrative embodiments, hybrid BAN NFC module 144 may include a first BAN electrode 151 to be in contact with a first area of the body of the user, and a second BAN electrode 152 to be in contact with a second area of the body of the user.

In one example, wearable device 140 may be in the form of a ring. According to this example, first BAN electrode 151 may be located on a first side of the ring, and second BAN electrode 152 may be located on a second, e.g., opposite, side of the ring, e.g., as described below with reference to FIG. 2.

In another example, wearable device 140 may be in the form of a wristwatch. According to this example, first BAN electrode 151 may be located on a first side of a watchband of the wristwatch, and second BAN electrode 152 may be located on a second, e.g., opposite, side on the watchband of the wristwatch, e.g., as described below with reference to FIG. 3.

In some demonstrative embodiments, BAN electrodes 131, 132, 151 and/or 152 may include capacitive and/or conductive pads, configured to transfer and/or to receive capacitively-coupled signals via the human body.

In some demonstrative embodiments, hybrid BAN NFC module 124 may include an insulation area 133 to electrically insulate between BAN electrodes 131 and 132.

In some demonstrative embodiments, insulation area 133 may be configured to avoid short circuiting BAN electrodes 131 and 132, for example, when hybrid BAN NFC module 124 provides power supply to device 140.

In some demonstrative embodiments, insulation area 133 may be configured to minimize a self capacitance of BAN electrodes 131 and 132, and/or to maximize capacitance of BAN NFC channel 103.

In some demonstrative embodiments, hybrid BAN NFC module 144 may include an insulation area 153 to electrically insulate between BAN electrodes 151 and 152.

In some demonstrative embodiments, insulation area 153 may be configured to avoid short circuiting BAN electrodes 151 and 152, for example, when hybrid BAN NFC module 124 provides power supply to device 140.

In some demonstrative embodiments, insulation area 153 may be configured to minimize a self capacitance of BAN electrodes 151 and 152, and/or to maximize capacitance of BAN NFC channel 103.

In some demonstrative embodiments, insulation area 153 may be configured to provide a self sufficient return path for the electric current provided by hybrid BAN NFC module 124, for example, if the user of device 140 is not grounded.

In some demonstrative embodiments, hybrid BAN NFC module 124 may include an NFC coil 134 connected in parallel to BAN electrodes 131 and 132.

In some demonstrative embodiments, hybrid BAN NFC module 144 may include an NFC coil 156 connected in parallel to BAN electrodes 151 and 152.

In some demonstrative embodiments, NFC coils 134 and/or 154 may include a printed circuit board (PCB) coil, a flexible printed circuit (FPC) coil, a metal wire, e.g., created through a laser direct structuring (LDS) process, and/or a coil directly embedded on the metallic chassis and/or under a conductive coating of computing device 120 and/or NFC device 140.

In some demonstrative embodiments, NFC coil 134 may be connected, directly or indirectly, to BAN electrodes 131 and 132 via parallel coil prongs 138, e.g., inductive coil prongs.

In some demonstrative embodiments, NFC coil 156 may be connected, directly or indirectly, to BAN electrodes 151 and 152 via parallel coil prongs 158, e.g., inductive coil prongs.

In some demonstrative embodiments, NFC coil 134 may be configured to provide power supply to device 140, for example, via an inductive coupling.

In some demonstrative embodiments, NFC coils 134 and/or 154 may perform the functionality of an antenna to communicate between hybrid BAN NFC modules 124 and 144.

In one example, NFC coils 134 and/or 154 may be configured to operate on a resonant frequency, e.g., a frequency of 13.56 MHz, which may be different from a communication frequency of other networks.

In some demonstrative embodiments, hybrid BAN NFC module 124 may be able to transfer data utilizing the body of the user as a communication channel, for example, when BAN electrodes 131 and 132 are in contact with or brought close to, e.g., to a distance of a few millimeters from, a body of the user.

In some demonstrative embodiments, hybrid BAN NFC module 144 may be able to transfer data utilizing the body of the user as a communication channel, for example, when BAN electrodes 151 and 152 are in contact with or brought close to, e.g., to a distance of a few millimeters from, a body of the user.

In some demonstrative embodiments, hybrid BAN NFC modules 124 and 144 may be able to establish NFC BAN communication channel 103 via the body of the user, e.g., to enable computing device 120 to receive NFC information 148 from device 140, for example, if BAN electrodes 151 and 152 are in contact with a first part of the body of the user of NFC device 140, and BAN electrodes 131 and 132 are in contact with a second, e.g., different part of the body of the user.

In some demonstrative embodiments, hybrid BAN NFC modules 124 and 144 may be able to provide power supply to device 140 via the body of the user, e.g., via inductive coupling, for example, if BAN electrodes 151 and 152 are in contact with a first part of the body of the user of NFC device 140, and BAN electrodes 131 and 132 are in contact with a second, e.g., different part of the body of the user.

In some demonstrative embodiments, first BAN electrode 131 may be formed by a first surface of computing device 120.

In some demonstrative embodiments, second BAN electrode 132 may be formed by a second surface of device 140.

In some demonstrative embodiments, the first surface may be opposite to the second surface.

In some demonstrative embodiments, insulation area 133 may be formed between the first surface and the second surface to electrically insulate between BAN electrodes 131 and 132.

In some demonstrative embodiments, fingerprint sensor 126 may be positioned on the first surface.

In one example, computing device 120 may include a tablet. According to this example, BAN electrode 131 may be formed by a top/front surface of the tablet, e.g., a surface including a display of the tablet; BAN electrode 132 may be formed by a back/rear surface of the tablet; and fingerprint sensor 126 may be positioned on the front surface, for example, above the display, or at any other location.

According to this example, computing device 120 may authenticate the user using the two-factor authentication, for example, when a first finger of the user is in touch with the front surface and fingerprint sensor 126, and a second finger of the user is in touch with the back surface, e.g., as described below with reference to FIG. 2.

Figure 2:
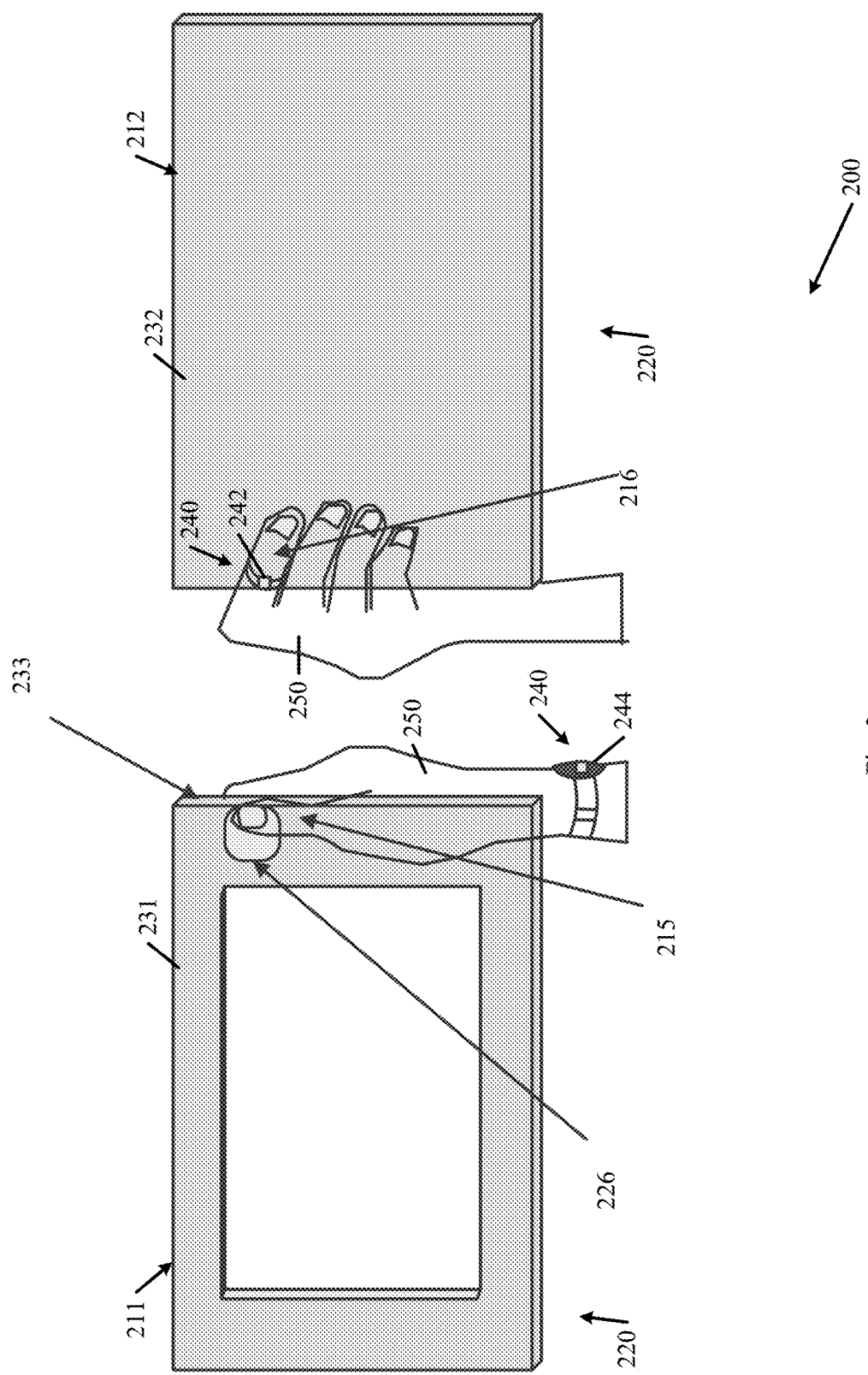
FIG. 2 is a schematic illustration of an interaction between a wearable device and a computing device implementing a one-touch input interface, in accordance with some demonstrative embodiments.

Reference is made to FIG. 2, which schematically illustrates an interaction between a wearable device 240 and a computing device 220 implementing a one-touch input interface, in accordance with some demonstrative embodiments. For example, computing device 220 may perform the functionality of computing device 120 (FIG. 1), wearable device 240 may perform the functionality of wearable device 140 (FIG. 1) and/or the one-touch input interface may perform the functionality of one-touch input interface 122 (FIG. 1). In one example (242), computing device 220 may include a tablet computer and/or wearable device 240 may be in the form of a ring.

In another example (244), computing device 220 may include the tablet computer and/or wearable device 240 may be in the form of a wristwatch.

As shown in FIG. 2, a first BAN electrode 231 may be formed by a front surface 211 of computing device 220 and/or a second BAN electrode 232 may be formed by a back surface 212 of computing device 220. For example, BAN electrodes 231 and/or 232 may perform the functionality of BAN electrodes 131 and/or 132 (FIG. 1), respectively.

As shown in FIG. 2, a fingerprint sensor 226 may be positioned on front surface 211. For example, fingerprint sensor 226 may perform the functionality of fingerprint sensor 126 (FIG. 1).

As shown in FIG. 2, an insulation area 233 may electrically insulate between BAN electrode 231 and BAN electrode 232. For example, insulation area 233 may perform the functionality of insulation area 133 (FIG. 1).

As shown in FIG. 2, a first finger 215, e.g., a thumb, of a user may be in contact with BAN electrode 231 and fingerprint sensor 226; and/or at least one second finger 216, e.g., the index finger, of the user may be in contact with BAN electrode 232.

In some demonstrative embodiments, tapping finger 215 on BAN electrode 231 and tapping finger 216 on BAN electrode 232, may enable to simultaneously or substantially simultaneously transfer NFC information 148 (FIG. 1) from wearable device 240 to computing device 220 via a body 250 of the user, and to sense the fingerprint of finger 216. Accordingly, tapping finger 215 on BAN electrode 231 and tapping finger 216 on BAN electrode 232, may enable to authenticate the user using the two-factor authentication, e.g., by utilizing fingerprint information 127 (FIG. 1) and NFC information 148 (FIG. 1).

Referring back to FIG. 1, in some demonstrative embodiments, BAN electrodes 131 and 132 may be positioned on a common surface, e.g., one next to the other.

In some demonstrative embodiments, insulation area 133 may be located between BAN electrodes 131 and 132 to electrically insulate between BAN electrodes 131 and 132.

In some demonstrative embodiments, fingerprint sensor 126 may be positioned on BAN electrode 131.

In one example, computing device 120 may include an authentication pad. According to this example, BAN electrodes 131 and/or 132 may be positioned one next to the other on the top surface of the authentication pad, and fingerprint sensor 126 may be positioned on BAN electrode 131, for example, at the center of BAN electrode 131.

According to this example, computing device 120 may authenticate the user using the two-factor authentication, for example, when the user touches BAN electrode 131 and fingerprint sensor 126 with a first finger, and BAN electrode 132 with a second finger, e.g., as described below with reference to FIG. 3.

In some demonstrative embodiments, BAN electrodes 131 and 132 may be positioned in any other configuration, which may enable the user to touch BAN electrodes 131 and 132 during a single hand touch or tap.

Figure 3:
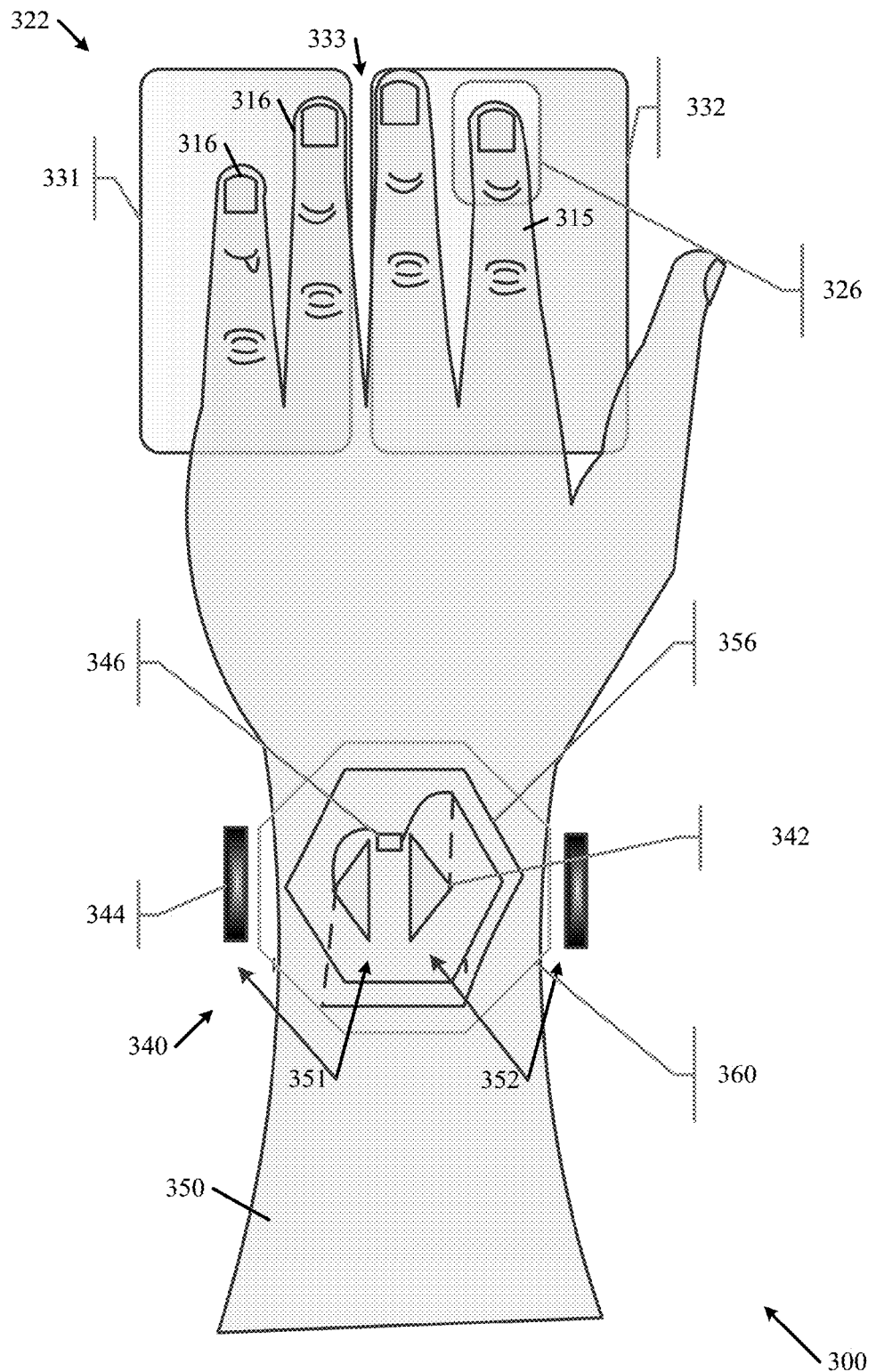
FIG. 3 is a schematic illustration of an interaction between a wearable device and a one-touch input interface, in accordance with some demonstrative embodiments.

Reference is made to FIG. 3, an interaction between a wearable device 340 and a one-touch input interface 322, in accordance with some demonstrative embodiments. For example, wearable device 340 may perform the functionality of wearable device 140 (FIG. 1) and/or one-touch input interface 322 may perform the functionality of one-touch input interface 122 (FIG. 1). In one example, a one-touch input interface 322 may be implemented in the form of an authentication pad, and/or wearable device 140 may be in the form of a wristwatch.

As shown in FIG. 3, one-touch input interface 322 may include a first BAN electrode 331 and a second BAN electrode 332, which may be positioned one next to the other, e.g., on a common surface. For example, BAN electrodes 331 and/or 332 may perform the functionality of ban electrodes 131 and/or 132 (FIG. 1), respectively.

As shown in FIG. 3, a fingerprint sensor 326 may be positioned on BAN electrode 331. For example, fingerprint sensor 326 may perform the functionality of fingerprint sensor 126 (FIG. 1).

As shown in FIG. 3, an insulation area 333 may insulate between BAN electrode 331 and BAN electrode 332. For example, insulation area 333 may perform the functionality of insulation area 133 (FIG. 1).

As shown in FIG. 3, wearable device 340 may include an NFC coil 356 and an NFC tag 346 including NFC information 148 (FIG. 1). For example, coil 356 may perform the functionality of coil 156 (FIG. 1), and/or NFC tag 346 may perform the functionality of NFC tag 146 (FIG. 1).

In some demonstrative embodiments, wearable device 340 may include a first BAN electrode 351 and a second BAN electrode 352 configured to be in contact with the wrist and/or the forearm of a hand 350 of the user. For example, BAN electrodes 331 and/or 332 may perform the functionality of ban electrodes 151 and/or 152 (FIG. 1), respectively.

As shown in FIG. 3, in one example (342), first BAN electrode 351 and second BAN electrode 352 may be positioned on a back surface 360 of the wristwatch.

As shown in FIG. 3, in another example (344), first BAN electrode 351 and second BAN electrode 352 may be positioned on opposite sides of a band of the wristwatch.

As shown in FIG. 3, a first finger 315, e.g., an index finger, of the user may be in contact with BAN electrode 331 and fingerprint sensor 326; and/or a second finger 316, e.g., the little finger and/or the ring finger, of the user may be in contact with BAN electrode 332.

In some demonstrative embodiments, tapping finger 315 on BAN electrode 331, tapping finger 316 on BAN electrode 332, and attaching of BAN electrodes 351 and 352 to hand 350, may enable transferring NFC information 248 from wearable device 140 to computing device 120 via hand 350 of the user, and sensing the fingerprint of finger 316, e.g., simultaneously or substantially simultaneously. Accordingly, one-touch input interface may enable authenticating the user using the two-factor authentication, e.g., by utilizing fingerprint information 127 (FIG. 1) and NFC information 148 (FIG. 1).

Figure 4:
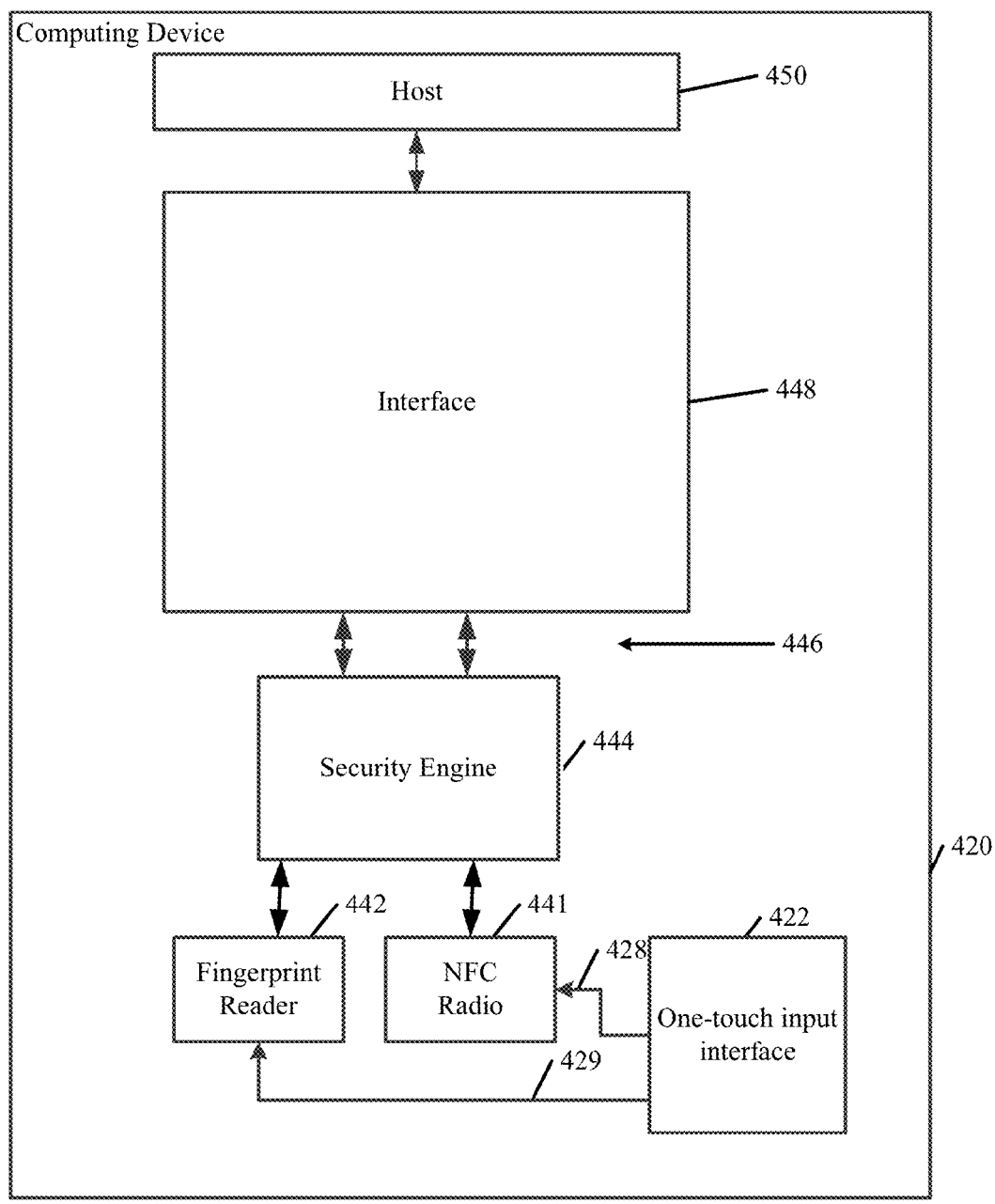
FIG. 4 is a schematic block diagram illustration of a system architecture of a computing device, in accordance with some demonstrative embodiments.

Reference is made to FIG. 4, which schematically illustrates system architecture of a computing device 420, in accordance with some demonstrative embodiments. For example, computing device 420 may perform the functionality of computing device 120 (FIG. 1).

As shown in FIG. 4, computing device 420 may include a one-touch input interface 422. For example, one-touch input interface 422 may perform the functionality of one-touch input interface 122 (FIG. 1).

In some demonstrative embodiments, one-touch input interface 422 may include two BAN electrodes and a fingerprint sensor, e.g., as described above.

As shown in FIG. 4, one-touch input interface 422 may provide NFC information 428 to an NFC radio 441. For example, NFC information 428 may perform the functionality of NFC information 148 (FIG. 1).

As shown in FIG. 4, one-touch input interface 422 may provide fingerprint information 429 to a fingerprint reader 442.

In some demonstrative embodiments, fingerprint reader 442 may read and/or process fingerprint information 429 and may provide to a security engine 444 the first factor for authentication of the user, e.g., a key, a code and/or any other information representing fingerprint information 429.

In some demonstrative embodiments, NFC radio 441 may read and/or process NFC information 428 and may provide to security engine 444 the second factor for authentication of the user, e.g., a key, a code and/or the like.

In some demonstrative embodiments, NFC radio 441 and fingerprint reader 442 may be directly connected to security engine 444 via a private bus, which is not exposed to an OS of computing device 420.

In some demonstrative embodiments, security engine 444 may process the first and second factors any may determine whether or not to authenticate the user, for example, based on authentication information 446 received from a host 450, e.g., a payment application, a secure login application, and the like, via an interface 448, e.g., a host embedded controller interface (HECI), and/or one or more other interface components configured to interface between security engine 444 and host 450.

Figure 5:
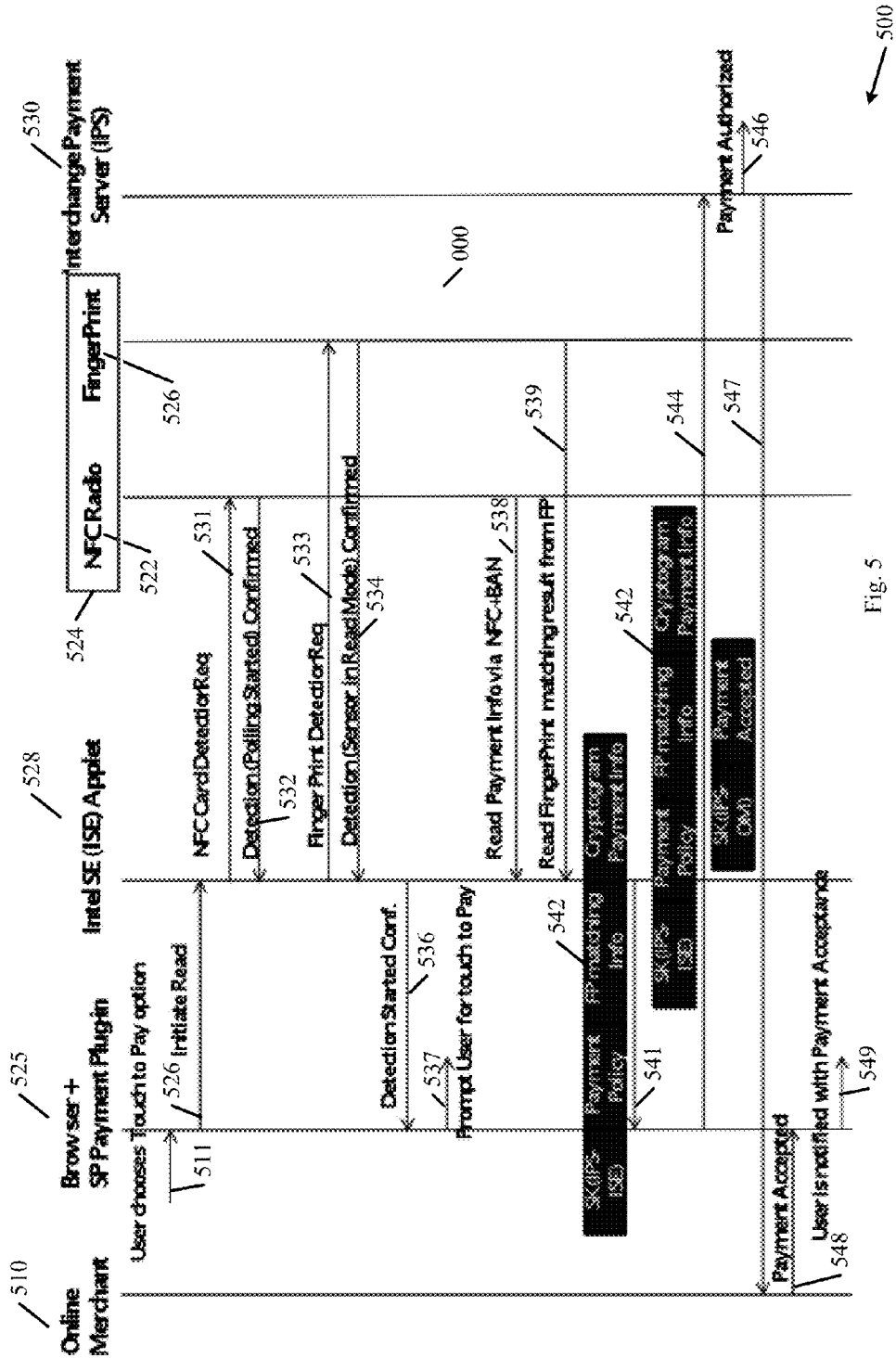
FIG. 5 is a schematic sequence diagram of operations and interactions between a one-touch input interface and a security processor, in accordance with some demonstrative embodiments.

Reference is made to FIG. 5, which schematically illustrates a sequence diagram 500 of operations and interactions between a security processor 528 and a one-touch input interface 524, in accordance with some demonstrative embodiments. For example, security processor 528 may perform the functionality of security processor 128 (FIG. 1), and/or one-touch input interface 524 may perform the functionality of one-touch input interface 122 (FIG. 1).

In some demonstrative embodiments, one-touch input interface 524 may include a fingerprint sensor 526 and/or a hybrid BAN NFC module 522. For example, fingerprint sensor 526 may perform the functionality fingerprint sensor 126 (FIG. 1), and/or hybrid BAN NFC module 522 may perform the functionality hybrid BAN NFC module 124 (FIG. 1).

In some demonstrative embodiments, one or more of the operations and/or interactions of sequence diagram 500 may be performed, for example, when a user performs an online payment via at least one application 525.

As shown in FIG. 5, the user may select (511) an option of "touch to pay" in application 525.

As shown in FIG. 5, application 525 may receive the selection of the user, and may initiate (526) security processor 528 to input authentication information from the user. For example, applications 125 (FIG. 1) may initiate security processor 128 (FIG. 1) to input the authentication information from the user of device 140 (FIG. 1), e.g., as described above.

As shown in FIG. 5, security processor 528 may send a request 531 to receive NFC information from hybrid BAN NFC module 522. For example, security processor 128 (FIG. 1) may send request 531 to hybrid BAN NFC module 124 (FIG. 1) to receive NFC information 148 (FIG. 1).

As shown in FIG. 5, hybrid BAN NFC module 522 may send to security processor 528 a confirmation 532 to confirm request 531. For example, hybrid BAN NFC module 124 (FIG. 1) may send confirmation 532 to security processor 128 (FIG. 1) to confirm request 531 for NFC information 148 (FIG. 1).

As shown in FIG. 5, security processor 528 may send a request 533 for fingerprint information from fingerprint sensor 526. For example, security processor 128 (FIG. 1) may send request 533 to fingerprint sensor 126 (FIG. 1) to receive fingerprint information 127 (FIG. 1).

As shown in FIG. 5, fingerprint sensor 526 may send a confirmation 534 to confirm request 533. For example, fingerprint sensor 126 (FIG. 1) may send confirmation 534 to security processor 128 (FIG. 1) to confirm request 533 for fingerprint information 127 (FIG. 1).

As shown in FIG. 5, security processor 528 may send to application 525 a notification 536 to notify application 525 to prompt the user to touch one-touch input interface 524. For example, security processor 128 (FIG. 1) may send notification 536 to applications 125 (FIG. 1) to notify applications 125 to initiate the authentication of the user.

As shown in FIG. 5, application 525 may prompt (537) the user via a user interface of application 525 to touch one-touch interface 524, for example, to perform the one-touch payment. For example, applications 125 (FIG. 1) may prompt the user, e.g., via user interface 112 (FIG. 1), to touch one-touch interface 122 (FIG. 1) e.g., as described above.

In some demonstrative embodiments, the user may touch one-touch interface 524, which may enable fingerprint sensor 526 to sense a fingerprint of the user and/or may enable hybrid BAN NFC module 522 to receive the NFC information, e.g., simultaneously or substantiality simultaneously. For example, the user may tap or touch one-touch interface 122 (FIG. 1), which may enable fingerprint sensor 126 (FIG. 1) to sense the fingerprint of the user and/or may enable hybrid BAN NFC module 124 (FIG. 1) to receive NFC information 148 (FIG. 1) from device 140 (FIG. 1), e.g., as described above.

As shown in FIG. 5, security processor 528 may receive NFC information 538 from hybrid BAN NFC module 522, and fingerprint information 539 from fingerprint sensor 526, for example, responsive to the user touching or tapping one-touch interface 524. For example, security processor 128 (FIG. 1) may receive NFC information 148 (FIG. 1) from hybrid BAN NFC module 124 (FIG. 1), and the fingerprint information from fingerprint sensor 126 (FIG. 1), for example, during and/or after the user taps or touches one-touch interface 122 (FIG. 1).

As shown in FIG. 5, security processor 528 may process NFC information 538 and fingerprint information 539, and may send (541) authentication information 542 to application 525, for example, to enable the user to perform the online payment. For example, security processor 128 (FIG. 1) may process NFC information 148 (FIG. 1) and the fingerprint information and may provide authentication information to applications 125 (FIG. 1).

In some demonstrative embodiments, authentication information 542 may include, for example, a payment policy, e.g., cash or credit; fingerprint information, e.g., a code representing the fingerprint of the user; encrypted payment information, e.g., a credit card number and/or personal details of the user; information relating to authentication of the user; and/or information to facilitate the online payment, e.g., personal details and the like.

As shown in FIG. 5, application 525 may receive authentication information 542, and may transmit (543) authentication information 542 to a server 530. For example, applications 125 (FIG. 1) may receive authentication information 542 and may transmit authentication information 542 to a server 530. For example, server 530 may perform the functionality of server 130 (FIG. 1).

In some demonstrative embodiments, server 530 may be configured to authorize and/or to approve the authentication of the user, and/or to approve the online payment, for example, server 530 may include an Intercharge Payment Server (IPS) of a credit card issuer.

As shown in FIG. 5, server 530 may receive authentication information 542, and may authorize (546) the online payment.

As shown in FIG. 5, server 530 may send confirmation 547 to a merchant 510 to enable merchant 510 to complete the online payment, for example, once authentication information 542 is approved.

As shown in FIG. 5, merchant 510 may send a confirmation 548 to application 525 to confirm the payment has been accepted, and application 525 may notify (549) the user that the payment is accepted, for example, via the user interface of application 525.

Figure 6:
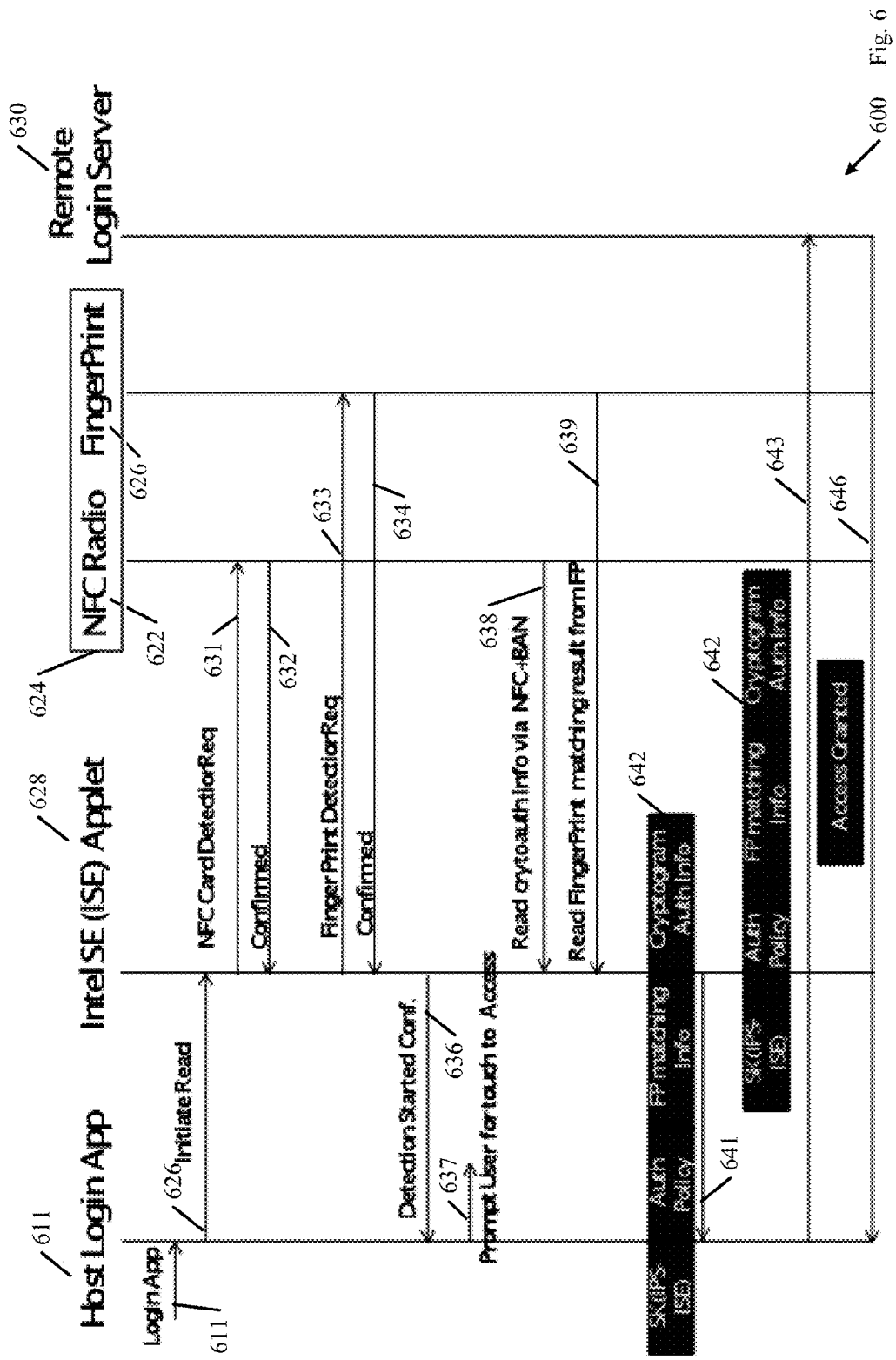
FIG. 6 is a schematic sequence diagram of operations and interactions between a one-touch input interface and a security processor, in accordance with some demonstrative embodiments.

Reference is made to FIG. 6, which schematically illustrates a sequence diagram 600 of operations and interactions between a security processor 628 and a one-touch input interface 624, in accordance with some demonstrative embodiments. For example, security processor 628 may perform the functionality of security processor 128 (FIG. 1), and/or one-touch input interface 624 may perform the functionality of one-touch input interface 122 (FIG. 1).

In some demonstrative embodiments, one-touch input interface 624 may include a fingerprint sensor 625 and/or a hybrid BAN NFC module 622. For example, fingerprint sensor 625 may perform the functionality fingerprint sensor 126 (FIG. 1), and/or hybrid BAN NFC module 622 may perform the functionality hybrid BAN NFC module 124 (FIG. 1).

In some demonstrative embodiments, one or more of the operations and/or interactions of sequence diagram 600 may be performed, for example, when the user requests access to an application, e.g., an operating system (OS) or any other application or service.

As shown in FIG. 6, the user may request 611 to Login to the application via a login application 625, for example, to enable performing one or more operations and/or functionalities of the OS.

As shown in FIG. 6, login application 625 may receive request 611 of the user, and may initiate (626) security processor 628 to input authentication information from the user. For example, applications 125 (FIG. 1) may initiate security processor 128 (FIG. 1) to input the authentication information from the user of device 140 (FIG. 1), e.g., as described above.

As shown in FIG. 6, security processor 628 may send a request 631 to receive NFC information from hybrid BAN NFC module 622. For example, security processor 128 (FIG. 1) may send request 631 to hybrid BAN NFC module 124 (FIG. 1) to receive NFC information 148 (FIG. 1).

As shown in FIG. 6, hybrid BAN NFC module 622 may send to security processor 628 a confirmation 632 to confirm request 631. For example, hybrid BAN NFC module 124 (FIG. 1) may send confirmation 632 to security processor 128 (FIG. 1) to confirm request 631 for NFC information 148 (FIG. 1).

As shown in FIG. 6, security processor 628 may send a request 633 for fingerprint information from fingerprint sensor 626. For example, security processor 128 (FIG. 1) may send request 633 to fingerprint sensor 126 (FIG. 1) for fingerprint information 127 (FIG. 1).

As shown in FIG. 6, fingerprint sensor 626 may send a confirmation 634 to confirm request 633. For example, fingerprint sensor 126 (FIG. 1) may send confirmation 634 to security processor 128 (FIG. 1) to confirm request 633 for fingerprint information 127 (FIG. 1).

As shown in FIG. 6, security processor 628 may send to login application 625 a notification 636, to notify login application 625 to prompt the user to touch one-touch input interface 624. For example, security processor 128 (FIG. 1) may send notification 636 to applications 125 (FIG. 1) to notify applications 125 to initiate the authentication of the user.

As shown in FIG. 6, login application 625 may prompt (637) the user via a user interface of login application 625 to touch one-touch interface 624, for example, to perform the secure login. For example, applications 125 (FIG. 1) may prompt the user, e.g., via user interface 112 (FIG. 1), to touch one-touch interface 122 (FIG. 1) e.g., as described above.

In some demonstrative embodiments, the user may touch or tap one-touch interface 624, which may enable fingerprint sensor 625 to sense a fingerprint of the user and/or may enable hybrid BAN NFC module 622 to receive the NFC information, e.g., simultaneously or substantially simultaneously. For example, the user may touch one-touch interface 122 (FIG. 1), which may enable fingerprint sensor 126 (FIG. 1) to sense the fingerprint of the user and/or may enable hybrid BAN NFC module 124 (FIG. 1) to receive NFC information 148 (FIG. 1) from device 140 (FIG. 1), e.g., as described above.

As shown in FIG. 6, security processor 628 may receive NFC information 638 from hybrid BAN NFC module 622, and fingerprint information 639 from fingerprint sensor 626, for example, responsive to the user touching or tapping one-touch interface 624. For example, security processor 128 (FIG. 1) may receive NFC information 148 (FIG. 1) from hybrid BAN NFC module 124 (FIG. 1), and the fingerprint information from fingerprint sensor 126 (FIG. 1); for example, during and/or after the user touches one-touch interface 122 (FIG. 1).

As shown in FIG. 6, security processor 628 may process NFC information 638 and fingerprint information 639 and may send (641) authentication information 642 to login application 625, for example, to enable the user to perform the secure login. For example, security processor 128 (FIG. 1) may process NFC information 148 (FIG. 1) and the fingerprint information, and may provide the authentication information to applications 125 (FIG. 1).

In some demonstrative embodiments, authentication information 642 may include, for example, an authentication policy, e.g., one factor authentication, two-factor authentication, multi-factor authentication or the like; fingerprint information, e.g., a code representing the fingerprint of the user; encrypted authentication information, e.g., personal details of the user; and/or any other information relating to authentication of the user.

As shown in FIG. 6, login application 625 may receive authentication information 642 and may transmit (643) authentication information 642 to a server 630. For example, applications 125 (FIG. 1) may receive authentication information 642 and may transmit authentication information 642 to a server 630. For example, server 630 may perform the functionality of server 130 (FIG. 1). In some demonstrative embodiments, server 630 may be configured to authorize and/or to approve the authentication of the user and/or to allow the secure login. For example, server 630 may include a remote login server of login application 625.

As shown in FIG. 6, server 630 may receive authentication information 42, and may authorize (646) the user to access the OS.

Figure 7:
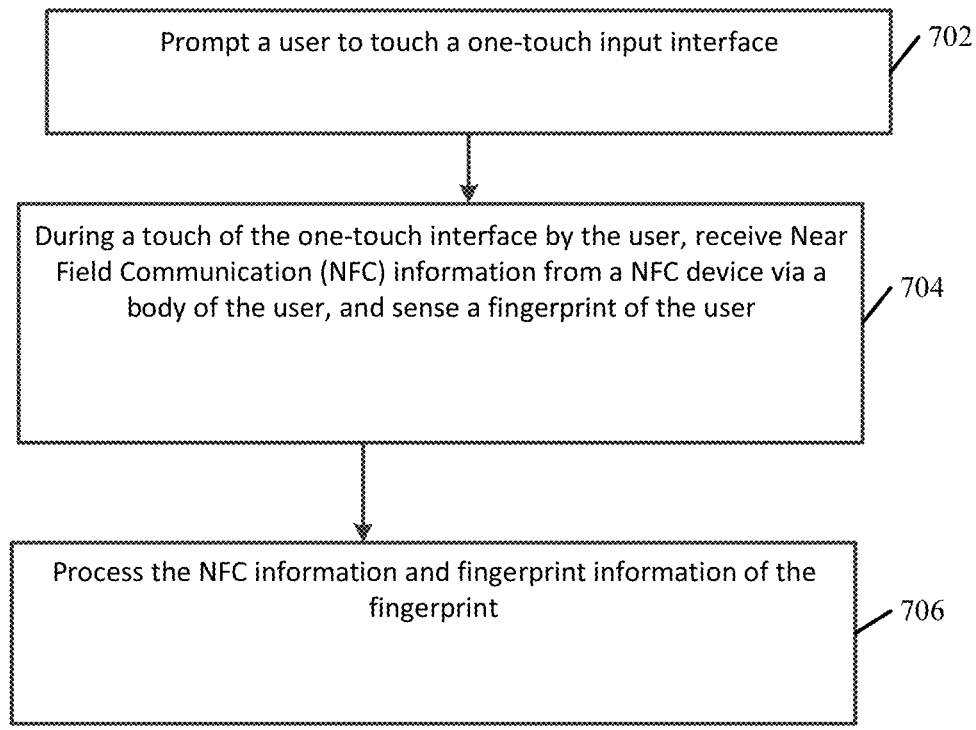
FIG. 7 is a schematic flow chart illustration of a method of receiving input from a user, in accordance with some demonstrative embodiments.

Reference is now made to FIG. 7, which schematically illustrates a method of two-factor authentications, in accordance with some demonstrative embodiments. For example, one or more of the operations of the method of FIG. 7 may be performed by a system, e.g., system 100 (FIG. 1); a computing device, e.g., computing device 120 (FIG. 1); a one-touch input interface, e.g., one-touch input interface 122 (FIG. 1); a hybrid BAN NFC module, e.g., hybrid BAN NFC module 124; a fingerprint sensor, e.g., fingerprint sensor 126 (FIG. 1); a user interface, e.g., user interface 112 (FIG. 1); and/or a security processor, e.g., security processor 128 (FIG. 1).

As indicated at block 702, the method may include prompting a user to touch a one-touch input interface. For example, user interface 112 (FIG. 1) may prompt the user of device 140 (FIG. 1) to touch one-touch input interface 122 (FIG. 1), e.g., as described above.

As indicated at block 704, the method may include during a touch of the one-touch interface by the user, receiving NFC information from an NFC device via a body of the user, and sensing a fingerprint of the user. For example, during the touch of one-touch input interface 122 (FIG. 1) by the user, hybrid BAN NFC module 124 (FIG. 1) may receive NFC information 148 (FIG. 1) from device 140 (FIG. 1) via the body of the user, and fingerprint sensor 126 (FIG. 1) may sense the fingerprint of the user, e.g., as described above.

As indicated at block 706, the method may include processing the NFC information and fingerprint information of the fingerprint. For example, security processor 128 (FIG. 1) may process NFC information 148 (FIG. 1) and fingerprint information 127 (FIG. 1), e.g., as described above.

Figure 8:
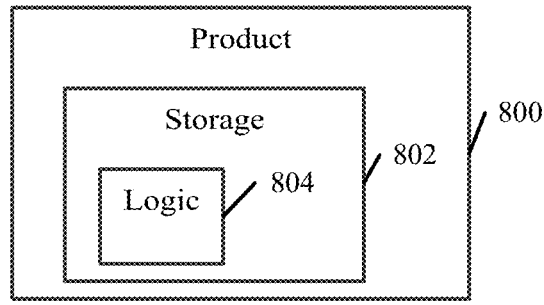
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable non-transitory storage media 802 to store logic 804, which may be used, for example, to control and/or to perform at least part of the functionality of computing device 120 (FIG. 1), one-touch input interface 122 (FIG. 1), hybrid BAN NFC module 124, fingerprint sensor 126 (FIG. 1), user interface 112 (FIG. 1), security processor 128 (FIG. 1), and/or to perform one or more operations of the method of FIG. 7. The phrase "non-transitory machine-readable medium" is directed to include all computer-readable media, with the sole exception being a transitory propagating signal.

In some demonstrative embodiments, product 800 and/or media 802 may include one or more types of computer-readable storage media capable of storing data, including volatile memory, non-volatile memory, removable or non-removable memory, erasable or non-erasable memory, writeable or re-writeable memory, and the like. For example, machine-readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a one-touch input interface comprising a hybrid Body-Area-Network (BAN) Near-Field-Communication (NFC) module to receive NFC information from a NFC device via a body of a user; and a fingerprint sensor to sense a fingerprint of the user, wherein the hybrid BAN NFC module and the fingerprint sensor are to receive the NFC information and to sense the fingerprint during a touch of the one-touch interface by the user.

Example 2 includes the subject matter of Example 1, and optionally, wherein the hybrid BAN NFC module is to be in contact with an area of a hand of the user, when the fingerprint sensor is to be in contact with a finger of the hand.

Example 3 includes the subject matter of Example 2, and optionally, wherein the hybrid BAN NFC module comprises a first BAN electrode to be in contact with a first area of the hand, and a second BAN electrode to be in contact with a second area of the hand.

Example 4 includes the subject matter of Example 3, and optionally, comprising an insulation area to electrically insulate between the first and second BAN electrodes.

Example 5 includes the subject matter of Example 3 or 4, and optionally, wherein the first BAN electrode includes a first surface of a device, wherein the second BAN electrode includes a second surface of the device, and wherein the fingerprint sensor is on the first surface.

Example 6 includes the subject matter of Example 5, and optionally, wherein the first surface is opposite to the second surface.

Example 7 includes the subject matter of Example 3, and optionally, wherein the first and second BAN electrodes are on a common surface, and wherein the fingerprint sensor is on the first BAN electrode.

Example 8 includes the subject matter of any one of Examples 3-7, and optionally, wherein the hybrid BAN NFC module comprises an NFC coil connected in parallel to the first and second BAN electrodes.

Example 9 includes the subject matter of any one of Examples 1-8, and optionally, wherein the hybrid BAN NFC module and the fingerprint sensor are to receive the NFC information and to sense the fingerprint during a tap of a hand of the user on the one-touch interface.

Example 10 includes the subject matter of any one of Examples 1-9, and optionally, wherein the NFC information comprises authentication information to authenticate the user.

Example 11 includes the subject matter of any one of Examples 1-10, and optionally, wherein the NFC information comprises payment information to facilitate a transaction of monetary value.

Example 12 includes a computing device comprising a memory; a one-touch input interface comprising a hybrid Body-Area-Network (BAN) Near-Field-Communication (NFC) module to receive NFC information from a NFC device via a body of a user; and a fingerprint sensor to sense a fingerprint of the user, wherein the hybrid BAN NFC module and the fingerprint sensor are to receive the NFC information and to sense the fingerprint during a touch of the one-touch interface by the user; and a processor to process the NFC information and fingerprint information of the fingerprint.

Example 13 includes the subject matter of Example 12, and optionally, wherein the hybrid BAN NFC module is to be in contact with an area of a hand of the user, when the fingerprint sensor is to be in contact with a finger of the hand.

Example 14 includes the subject matter of Example 13, and optionally, wherein the hybrid BAN NFC module comprises a first BAN electrode to be in contact with a first area of the hand, and a second BAN electrode to be in contact with a second area of the hand.

Example 15 includes the subject matter of Example 14, and optionally, wherein the one-touch input interface comprises an insulation area to electrically insulate between the first and second BAN electrodes.

Example 16 includes the subject matter of Example 14 or 15, and optionally, wherein the first BAN electrode includes a first surface of a device, wherein the second BAN electrode includes a second surface of the device, and wherein the fingerprint sensor is on the first surface.

Example 17 includes the subject matter of Example 16, and optionally, wherein the first surface is opposite to the second surface.

Example 18 includes the subject matter of Example 14, and optionally, wherein the first and second BAN electrodes are on a common surface, and wherein the fingerprint sensor is on the first BAN electrode.

Example 19 includes the subject matter of any one of Examples 14-18, and optionally, wherein the hybrid BAN NFC module comprises an NFC coil connected in parallel to the first and second BAN electrodes.

Example 20 includes the subject matter of any one of Examples 12-19, and optionally, wherein the hybrid BAN NFC module and the fingerprint sensor are to receive the NFC information and to sense the fingerprint during a tap of a hand of the user on the one-touch interface.

Example 21 includes the subject matter of any one of Examples 12-20, and optionally, wherein the NFC information comprises authentication information to authenticate the user.

Example 22 includes the subject matter of any one of Examples 12-21, and optionally, wherein the NFC information comprises payment information to facilitate a transaction of monetary value.

Example 23 includes the subject matter of any one of Examples 12-22, and optionally, comprising a user interface to prompt the user to touch the one-touch interface.

Example 24 includes the subject matter of any one of Examples 12-23, and optionally, comprising a laptop computer, a tablet computer, a Smartphone, or an Ultrabook™ computer.

Example 25 includes a method comprising prompting a user to touch a one-touch input interface; during a touch of the one-touch interface by the user, receiving Near Field Communication (NFC) information from a NFC device via a body of the user, and sensing a fingerprint of the user; and processing the NFC information and fingerprint information of the fingerprint.

Example 26 includes the subject matter of Example 25, and optionally, comprising receiving the NFC information via an area of a hand of the user, and sensing the fingerprint of a finger of the hand.

Example 27 includes the subject matter of Example 25 or 26, and optionally, comprising receiving the NFC information and sensing the fingerprint during a single tap of a hand of the user on the one-touch interface.

Example 28 includes the subject matter of any one of Examples 25-27, and optionally, wherein the NFC information comprises authentication information to authenticate the user.

Example 29 includes the subject matter of any one of Examples 25-28, and optionally, wherein the NFC information comprises payment information to facilitate a transaction of monetary value.

Example 30 includes a product including one or more tangible computer-readable non-transitory storage media comprising computer-executable instructions operable to, when executed by at least one computer processor, enable the at least one computer processor to implement a method comprising prompting a user to touch a one-touch input interface; during a touch of the one-touch interface by the user, receiving Near Field Communication (NFC) information from a NFC device via a body of the user, and sensing a fingerprint of the user; and processing the NFC information and fingerprint information of the fingerprint.

Example 31 includes the subject matter of Example 30, and optionally, wherein the method comprises receiving the NFC via an area of a hand of the user, and sensing the fingerprint of a finger of the hand.

Example 32 includes the subject matter of Example 30 or 31, and optionally, wherein the method comprises receiving the NFC information and sensing the fingerprint during a single tap of a hand of the user on the one-touch interface.

Example 33 includes the subject matter of any one of Examples 30-32, and optionally, wherein the NFC information comprises authentication information to authenticate the user.

Example 34 includes the subject matter of any one of Examples 30-33, and optionally, wherein the NFC information comprises payment information to facilitate a transaction of monetary value.

Example 35 includes an apparatus comprising one-touch interface means for receiving Near Field Communication (NFC) information from a NFC device via a body of a user, and sensing a fingerprint of the user, during a touch of the one-touch interface means by the user; and means for processing the NFC information and fingerprint information of the fingerprint.

Example 36 includes the subject matter of Example 35, and optionally, wherein the one-touch interface means comprises a hybrid BAN NFC module to be in contact with an area of a hand of the user, and a fingerprint sensor to be in contact with a finger of the hand.

Example 37 includes the subject matter of Example 36, and optionally, wherein the hybrid BAN NFC module comprises a first BAN electrode to be in contact with a first area of the hand, and a second BAN electrode to be in contact with a second area of the hand.

Example 38 includes the subject matter of Example 37, and optionally, comprising means for electrically insulating between the first and second BAN electrodes.

Example 39 includes the subject matter of Example 37 or 38, and optionally, wherein the first BAN electrode includes a first surface of a device, wherein the second BAN electrode includes a second surface of the device, and wherein the fingerprint sensor is on the first surface.

Example 40 includes the subject matter of Example 39, and optionally, wherein the first surface is opposite to the second surface.

Example 41 includes the subject matter of Example 37, and optionally, wherein the first and second BAN electrodes are on a common surface, and wherein the fingerprint sensor is on the first BAN electrode.

Example 42 includes the subject matter of any one of Examples 37-41, and optionally, wherein the one-touch interface means comprises an NFC coil connected in parallel to the first and second BAN electrodes.

Example 43 includes the subject matter of any one of Examples 35-42, and optionally, wherein the one-touch interface means comprises means for receiving the NFC information and sensing the fingerprint during a single tap of a hand of the user on the one-touch interface means.

Example 44 includes the subject matter of any one of Examples 35-43, and optionally, wherein the NFC information comprises authentication information to authenticate the user.

Example 45 includes the subject matter of any one of Examples 35-44, and optionally, wherein the NFC information comprises payment information to facilitate a transaction of monetary value.

Example 46 includes a wearable device to be worn on a body of a user, the wearable device including a hybrid Body-Area-Network (BAN) Near-Field-Communication (NFC) module to transmit NFC information from the wearable device to a computing device via the body, the hybrid BAN NFC module comprising a first BAN electrode to be in contact with a first area of the body; a second BAN electrode to be in contact with a second area of the body; an NFC coil connected in parallel to the first and second BAN electrodes; and an insulation area to electrically insulate between the first and second BAN electrodes.

Example 47 includes the subject matter of Example 46, and optionally, wherein the NFC information comprises at least one type of information selected from the group consisting of authentication information to authenticate the user, and payment information to facilitate a transaction of monetary value.

Example 48 includes the subject matter of Example 46, and optionally, comprising an NFC tag to store the NFC information.

Example 49 includes the subject matter of Example 46, and optionally, wherein the wearable device is a wristwatch or a ring.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A one-touch input interface comprising:
    a hybrid Body-Area-Network (BAN) Near-Field-Communication (NFC) module to receive NFC information from a NFC device via a body of a user, said hybrid BAN NFC module comprises a first BAN electrode configured to be in contact with a first area of a hand of said user, and a second BAN electrode configured to be in contact with a second area of said hand; and
    a fingerprint sensor to sense a fingerprint of said user, wherein said hybrid BAN NFC module and said fingerprint sensor are to receive said NFC information and to sense said fingerprint during a touch of said one-touch interface by said user, wherein said hybrid BAN NFC module is configured to be in contact with the hand of said user, when said fingerprint sensor is to be in contact with a finger of said hand.

2. The one-touch input interface of claim 1 comprising an insulation area to electrically insulate between said first and second BAN electrodes.

3. The one-touch input interface of claim 1, wherein said first BAN electrode includes a first surface of a device, wherein said second BAN electrode includes a second surface of said device, and wherein said fingerprint sensor is on said first surface.

4. The one-touch input interface of claim 3, wherein said first surface is opposite to said second surface.

5. The one-touch input interface of claim 1, wherein said first and second BAN electrodes are on a common surface, and wherein said fingerprint sensor is on said first BAN electrode.

6. The one-touch input interface of claim 1, wherein said hybrid BAN NFC module comprises an NFC coil connected in parallel to said first and second BAN electrodes.

7. The one-touch input interface of claim 1, wherein said hybrid BAN NFC module and said fingerprint sensor are to receive said NFC information and to sense said fingerprint during a tap of the hand of said user on said one-touch interface.

8. The one-touch input interface of claim 1, wherein said NFC information comprises at least one type of information selected from the group consisting of authentication information to authenticate said user, and payment information to facilitate a transaction of monetary value.

9. A computing device comprising:
    a memory;
    a one-touch input interface comprising:
        a hybrid Body-Area-Network (BAN) Near-Field-Communication (NFC) module to receive NFC information from a NFC device via a body of a user, said hybrid BAN NFC module comprises a first BAN electrode configured to be in contact with a first area of a hand of said user, and a second BAN electrode configured to be in contact with a second area of said hand; and
        a fingerprint sensor to sense a fingerprint of said user, wherein said hybrid BAN NFC module and said fingerprint sensor are to receive said NFC information and to sense said fingerprint during a touch of said one-touch interface by said user, wherein said hybrid BAN NFC module is configured to be in contact with the hand of said user, when said fingerprint sensor is to be in contact with a finger of said hand; and
    a processor to process said NFC information and fingerprint information of said fingerprint.

10. The computing device of claim 9, wherein said hybrid BAN NFC module and said fingerprint sensor are configured to receive said NFC information and to sense said fingerprint during a tap of the hand of said user on said one-touch interface.

11. The computing device of claim 9, wherein said NFC information comprises at least one type of information selected form the group consisting of authentication information to authenticate said user, and payment information to facilitate a transaction of monetary value.

12. The computing device of claim 9, wherein said first BAN electrode includes a first surface of the computing device, wherein said second BAN electrode includes a second surface of said computing device, and wherein said fingerprint sensor is on said first surface.

13. The computing device of claim 9, wherein said first and second BAN electrodes are on a common surface, and wherein said fingerprint sensor is on said first BAN electrode.

14. The computing device of claim 9, wherein said hybrid BAN NFC module comprises an NFC coil connected in parallel to said first and second BAN electrodes.

15. The computing device of claim 9 comprising a user interface to prompt said user to touch said one-touch interface.

16. The computing device of claim 9 comprising a laptop computer, a tablet computer, a Smartphone, or an Ultrabook™ computer.

17. A product including one or more tangible computer-readable non-transitory storage media comprising computer-executable instructions operable to, when executed by at least one computer processor, enable the at least one computer processor to implement one or more operations, the operations comprising:
prompting a user to touch a one-touch input interface;
during a touch of said one-touch interface by said user, receiving Near Field Communication (NFC) information from a NFC device via a body of said user, and sensing a fingerprint of said user, wherein the receiving the NFC information comprises receiving the NFC information via a first Body-Area-Network (BAN) electrode in contact with a first area of a hand of said user, and a second BAN electrode in contact with a second area of said hand, and wherein sensing the fingerprint of the user comprise sensing a fingerprint of a finger of said hang, when said first and second BAN electrodes are in contact with the hand of said user; and
processing said NFC information and fingerprint information of said fingerprint.

18. The product of claim 17, wherein said NFC information comprises at least one type of information selected from the group consisting of authentication information to authenticate said user, and payment information to facilitate a transaction of monetary value.

19. The product of claim 17, wherein said operations comprise receiving said NFC information and sensing said fingerprint during a single tap of the hand of said user on said one-touch interface.

20. A wearable device to be worn on a body of a user, the wearable device including:
a hybrid Body-Area-Network (BAN) Near-Field-Communication (NFC) module to transmit NFC information from said wearable device to a computing device via said body, the hybrid BAN NFC module comprising:
a first BAN electrode to be in contact with a first area of said body;
a second BAN electrode to be in contact with a second area of said body;
an NFC coil connected in parallel to said first and second BAN electrodes; and
an insulation area to electrically insulate between said first and second BAN electrodes.

21. The wearable device of claim 20, wherein said NFC information comprises at least one type of information selected from the group consisting of authentication information to authenticate said user, and payment information to facilitate a transaction of monetary value.

22. The wearable device of claim 20 comprising an NFC tag to store said NFC information.

23. The wearable device of claim 20 being a wristwatch or a ring.

* * * * *